United States Patent
Gause et al.

(10) Patent No.: US 10,826,340 B2
(45) Date of Patent: Nov. 3, 2020

(54) ROTOR FOR A SYNCHRONOUS MOTOR

(71) Applicant: ETAL S.A., Môtiers (CH)

(72) Inventors: Alfred Gause, Baltmannsweiler (DE);
Alessandro Fasolo, Neuchatel (DE);
Nicolay Komarevskiy, Neuchatel (CH);
Johann Pourchet, La Chaux (FR)

(73) Assignee: ETEL S.A. (CH)

( * ) Notice: Subject to any disclaimer, the term of this patent is extended or adjusted under 35 U.S.C. 154(b) by 400 days.

(21) Appl. No.: 15/656,516

(22) Filed: Jul. 21, 2017

(65) Prior Publication Data

US 2018/0034330 A1 Feb. 1, 2018

(30) Foreign Application Priority Data

Jul. 29, 2016 (EP) .................................. 16181819

(51) Int. Cl.
*H02K 1/27* (2006.01)
*H02K 15/03* (2006.01)
*H02K 41/03* (2006.01)

(52) U.S. Cl.
CPC ......... *H02K 1/2773* (2013.01); *H02K 1/2706* (2013.01); *H02K 1/276* (2013.01); *H02K 15/03* (2013.01); *H02K 41/031* (2013.01)

(58) Field of Classification Search
CPC ........ H02K 21/16; H02K 1/27; H02K 1/2706; H02K 1/2713; H02K 1/272; H02K 1/2726; H02K 1/2733; H02K 1/274; H02K 1/2746; H02K 1/2753; H02K 1/276; H02K 1/2773; H02K 15/03; H02K 41/031; Y10T 29/49078; Y10T 29/49075; Y10T 29/49012

USPC ......................................................... 29/598
See application file for complete search history.

(56) References Cited

U.S. PATENT DOCUMENTS

| 4,445,062 | A |   | 4/1984 | Glaser |
| 5,705,874 | A | * | 1/1998 | Grudl ..................... H02K 1/146 |
|   |   |   |   | 29/596 |
| 9,343,935 | B2 |   | 5/2016 | Moder et al. |
| 9,634,527 | B2 |   | 4/2017 | Zhang et al. |
| 9,634,528 | B2 |   | 4/2017 | Zhang et al. |
| 2013/0187486 | A1 | * | 7/2013 | Lee ......................... H02K 5/02 |
|   |   |   |   | 310/43 |

(Continued)

FOREIGN PATENT DOCUMENTS

| EP | 2926439 | 6/1999 |
| EP | 2696469 | 2/2012 |

(Continued)

*Primary Examiner* — Quyen P Leung
*Assistant Examiner* — Alexander A Singh
(74) *Attorney, Agent, or Firm* — Carter, DeLuca & Farrell LLP

(57) ABSTRACT

A rotor for a synchronous motor includes teeth arranged at regular intervals, project from a rotor core in the radial direction, and taper in a cross-section in the direction of the rotor core. The rotor also includes tangentially magnetized magnets that are arranged in gaps between the teeth and are trapezoidal in cross-section. The teeth are connected via a flexible joint to the rotor core, and the teeth are deflected in the tangential direction such that in every other gap between two teeth, first magnets rest against outer stops at the ends of the teeth facing away from the rotor core.

18 Claims, 1 Drawing Sheet

(56) References Cited

U.S. PATENT DOCUMENTS

2014/0375160 A1* 12/2014 Zhang .................... H02K 21/16
　　　　　　　　　　　　　　　　　　　　　310/154.26
2015/0001977 A1　　1/2015　Zhang et al.
2015/0303751 A1　10/2015　Ekin et al.

FOREIGN PATENT DOCUMENTS

EP　　　2826129　　　1/2015
FR　　　2578116 A1　8/1986

* cited by examiner

ROTOR FOR A SYNCHRONOUS MOTOR

CROSS-REFERENCE TO RELATED APPLICATIONS

The present application claims priority to Application No. 16181819.0, filed in the European Patent Office on Jul. 29, 2016, which is expressly incorporated herein in its entirety by reference thereto.

FIELD OF THE INVENTION

The present invention relates to a rotor for a synchronous motor, e.g., having magnets that are tangentially magnetized and arranged in gaps between teeth of the rotor. This placement is meant to concentrate the flux because each tooth is thereby magnetized by its two adjacent magnets.

BACKGROUND INFORMATION

In the case of a rotor of a synchronous motor, it is described in European Published Patent Application No. 2 696 469 to place tangentially magnetized magnets having a trapezoidal cross-section between teeth of the rotor that taper in the direction of the center of the rotor. The interspaces or gaps situated between the teeth and widening toward the center of the rotor are substantially filled by the magnets having a trapezoidal cross-section.

Due to the tangential magnetization of the magnets, the teeth act as magnetic poles vis-à-vis the stator. Via the two teeth surrounding a magnet, the flux of the magnets is virtually completely direction to the air gap between the stator and rotor. In contrast, in an also common radial magnetization of the magnets, only a portion of the flux is directed to the air gap while another portion is merely directed by a magnetic yoke within the rotor to the adjacent magnet.

One problem in the production of such a system and similar systems by which the magnetic flux from the rotor to the stator is able to be maximized relates to the production-related tolerances of the shape of the magnets. While these tolerances do not cause any problems in the case of radially magnetized magnets that are bonded to the rotor, these tolerances may lead to problems with tangentially magnetized magnets that are inserted between teeth of the rotor. The gaps between the teeth must also be able to accommodate magnets at the upper end of the tolerance range, meaning that gaps between the magnets and the teeth may occur with the magnets that happen to have smaller shapes. Such gaps may have the result that the magnets do not sit in the rotor with the required stability and may detach during the operation. The symmetry of the rotor may also be lost, thereby creating considerable additional cogging forces, which, for example, interfere with the precise positioning with the aid of such a motor.

SUMMARY

Example embodiments of the present invention provide a rotor for a synchronous motor as well as a method for its production, which allow for a symmetrical and stable placement of the magnets in the rotor despite production-related tolerances in the shape of the magnets.

According to an example embodiment of the present invention, a rotor for a synchronous motor includes teeth that are disposed at regular intervals, project from a rotor core in the radial direction, and taper in cross-section in the direction of the rotor core. In addition, the rotor has tangentially magnetized magnets that are trapezoidal in cross-section and are situated in gaps between these teeth. An important feature of the rotor is that the teeth are connected to the rotor core via a flexible joint and that the teeth are deflected in the tangential direction such that in every other gap between two teeth, first magnets are resting against outer stops at the ends of the teeth facing away from the rotor core.

If the first magnets are inserted first during the production of this rotor, then the prevailing reluctance forces drive these magnets as far away as possible from the rotor core towards the ends of the teeth, where they finally come to rest against the outer stops provided there. Even magnets whose dimensions are at the upper margin of the specification do reach this position because the teeth are able to be deflected in the tangential direction due to the flexible joints, thereby creating sufficient room even for the larger magnets. When the remaining magnets are inserted in the following step, less room is available for these magnets, and the teeth can also no longer be pressed tangentially toward the side. The remaining magnets are thus pressed outwardly only up to a position in which their slanted sidewalls enter into a positive engagement with the tapering sidewalls of the teeth.

As a result, a rotor is obtained in which, despite a certain variance in the dimensions of the magnets, each magnet is stably retained in its respective position in the tangential direction by its adjacent teeth. Furthermore, the field lines of each magnet are not required to overcome an air gap toward the side teeth.

It may be provided that remaining second magnets are retained closer to the rotor core than the first magnets by a positive engagement with lateral surfaces of the teeth.

It may further be provided that the magnets are divided into two parts. For example, each magnet may be divided into an outer magnet piece, having a trapezoidal cross-section, and an inner magnet piece, e.g., having a trapezoidal or rectangular cross-section.

The inner magnet pieces may rest against inner stops premolded on the rotor core between the teeth, so that all inner magnet pieces are located at a same distance from the rotor core.

A first gap may be located between the outer magnet piece and the inner magnet piece of each first magnet, and either (a) a second gap, smaller than the first gap, may be located between the outer magnet piece and the inner magnet piece of remaining second magnets or (b) no gap may be located between the outer magnetic piece and the inner magnetic piece of the remaining second magnets.

The rotor may be arranged as a secondary part of a rotary or linear synchronous motor, e.g., a segment of a rotary rotor having an infinite radius.

The rotor may be produced by inserting all outer magnet pieces of the first magnets into every other gap between the teeth, and tangentially deflecting the teeth adjacent to the first magnets so that the inserted outer magnet pieces rest against the outer stops.

The method of producing the rotor may further include inserting inner magnet pieces, and pushing the inner magnet pieces toward the rotor core by magnetic repulsion of a respective outer magnet piece so that the inner magnet pieces rest against inner stops provided on the rotor core.

The method may also include inserting outer magnet pieces of remaining second magnets into empty gaps between the teeth, the outer magnet pieces of the remaining second magnets moving away from the rotor core so that the remaining second magnets are retained a positive engagement with lateral surfaces of the teeth.

Further features and aspects of example embodiments of the present invention are described in more detail below with reference to the appended Figures.

DETAILED DESCRIPTION

Figure 1:
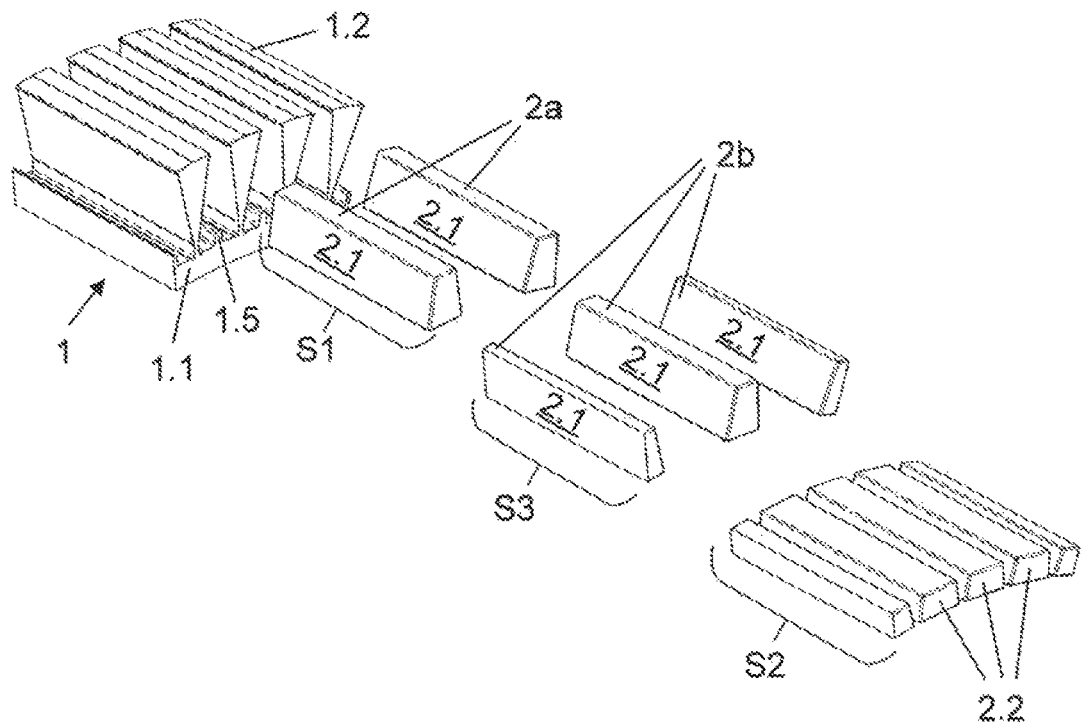
FIG. 1 is an exploded perspective view of a rotor segment.
Figure 2:
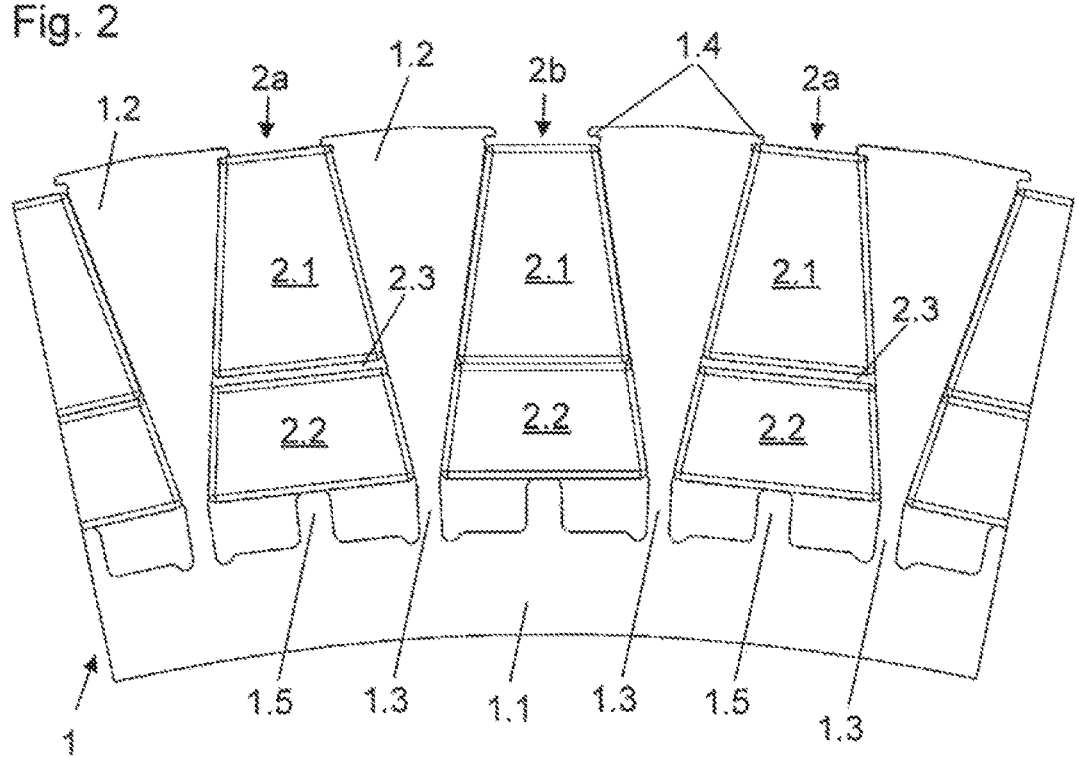
FIG. 2 is a cross-sectional view of a rotor segment.

FIGS. 1 and 2 illustrate a segment of a rotor 1 according to an example embodiment, of the present invention. FIG. 1 is an exploded view of rotor 1, from which the method for its production can be understood. FIG. 2 is a cross-sectional view through rotor 1, in which the rotor axis is situated perpendicular to the drawing plane.

Disposed on a rotor core 1.1 facing the center of rotor 1 are outwardly projecting teeth 1.2, which are connected via a weakened spot acting as flexible joint 1.3 to rotor core 1.1 in each case. A flexible joint 1.3 having the thinnest possible configuration also provides the advantage that minimal magnetic flux reaches the rotor core where it would not be able to contribute to the torque of the motor.

Furthermore, teeth 1.2 have at their outwardly directed ends, i.e., the ends facing away from rotor core 1.1, outer stops 1.4 for first magnets 2a. In addition, outwardly projecting inner stops 1.5 are provided on rotor core 1.1, which are arranged as projections on rotor core 1.1 in the gaps between teeth 1.2.

Rotor 1 may be arranged in the form of a laminated core. The shape of an individual sheet is evident from FIG. 2. Magnets 2a, 2b have a symmetrical trapezoidal shape in cross-section, or in other words, they taper outwardly in their cross-sections, i.e., are broader toward rotor core 1.1 than on the side facing away from rotor core 1.1.

The shape of magnets 2a, 2b generally corresponds to the shape of the gaps between teeth 1.2 because the teeth widen in the direction of rotor core 1.1. The side surfaces of teeth 1.2 and magnets 2a, 2b that are in contact with one another are inclined at the same angle relative to the radial direction.

Magnets 2a, 2b may be divided, e.g., into a respective outer magnet piece 2.1 and an inner magnet piece 2.2. The two magnet pieces 2.1, 2.2 are subdivided such that at least outer magnet piece 2.1 has a symmetrical trapezoidal form in cross-section. This may also apply to inner magnet piece 2.2, which, however, may also have other shapes, such as a cuboidal shape, which is rectangular in cross-section.

As illustrated in FIG. 2, first magnets 2a, which fill every other gap between teeth 1.2, are located at a slightly greater distance from rotor core 1.1, and are resting against outer stops 1.4 of teeth 1.2. In contrast, remaining magnets 2b are located slightly lower or closer to rotor core 1.1. They do not reach outer stops 1.4. A positive fit between the lateral boundaries of teeth 1.2 and remaining magnets 2b prevents magnets 2b from moving farther toward the outside.

The divided arrangement of magnets 2a, 2b provides the result that, as described above, outer magnet pieces 2.1 are alternately positioned farther away or closer to rotor core 1.1. Because of the magnetic repulsion between the inner and outer magnet pieces 2.1, 2.2, which are magnetized in pairs having the same orientation in each case, inner magnet pieces 2.2 are pressed completely toward the inside until they come to rest against inner stop 1.5 of rotor core 1.1. This results in a gap 2.3 between the two magnet pieces 2.1, 2.2 that has a different width in the radial direction. It is greater in the case of first magnets 2a than for remaining magnets 2b, where it may also vanish in the extreme case so that magnet pieces 2.1, 2.2 are in direct contact with each other. This is the case if the dimensions of involved magnets 2a, 2b or magnet pieces 2.1, 2.2 are at the upper end of the specification.

The creation of this system of magnets 2a, 2b and/or of their magnet pieces 2.1, 2.2 becomes clear when considering the method for producing rotor 1. This method is explained with reference to FIG. 1.

In a first step S1, outer magnet pieces 2.1 of first magnets 2a are slipped into every other gap between teeth 1.2 in rotor 1. They are pressed up to outer stops 1.4 by reluctance forces. Since teeth 1.2 are tangentially or laterally deflectable due to flexible joints 1.3, the gaps are able to also accommodate first magnets 2a that are at the Upper end of the specification or production variances with regard to their dimensions.

In another, e.g., second, step S2, all inner magnet pieces 2.2 are then slipped into rotor 1, these magnets remaining in the inner position through a direct repulsion or through reluctance forces.

In another, e.g., third, step S3, outer magnet pieces 2.1 of remaining magnets 2b are slipped into the gaps that still remain free. Because of teeth 1.2 that were already tangentially deflected by outer magnet pieces 2.1 of first magnets 2a, they are unable to fully reach outer stops 1.4 and thus are located slightly closer to rotor core 1.1 and are radially repelled by inner magnet pieces 2.2. In the process, inner magnet pieces 2.2 are pushed towards rotor core 1.1 or against inner stops 1.5.

The second and third steps S2 and S3 may also be switched in a variation of the method.

The arrangement of teeth 1.2 and magnets 2a, 2b thus has the result that magnets 2a, 2b always assume a particularly defined position regardless of a certain production variance of their dimensions. At most, minor fluctuations remain in the radial position of remaining magnets 2b (or of their outer magnet piece 2.1), so that a highly symmetrical rotor results as a whole, whose magnets assume defined and thus stable positions. Rotor 1 has an even number of magnets 2a, 2b.

The fluctuations in the dimension of magnets 2a, 2b are compensated by adapting the radial position of the neighboring magnets and are unable to add up across multiple magnets, which could lead to a considerable asymmetry and loosely sitting magnets. In other words, tolerances in the dimensions of the magnets are compensated for in an uncomplicated manner.

This compensating effect is able to be achieved even if magnets 2a, 2b are not split into two parts as illustrated. However, magnets 2a, 2b may also be divided into three or more pieces or be made up of a single, trapezoidal magnet piece.

For motors that are to rotate particularly quickly, inner magnet pieces 2.2 and/or remaining magnets 2b may also be omitted. For reasons of stability, the omitted elements may be replaced by correspondingly shaped placeholders made of a non-magnetic material. Even then, averaging the different sizes of the magnets due to the tangentially deflectable teeth 1.2 is achieved.

Outer stops 1.4 need not necessarily be premolded on teeth 1.2. Other forms of stops may be provided as well, such as a ring encircling rotor 1 or a sleeve, each preventing first magnets 2a from sliding out of rotor 1.

It should be appreciated that the principles described herein is not limited to rotary motors. The secondary part of a linear motor may be constructed as described herein, a linear motor corresponding to the borderline case of a rotor segment having an infinite radius of curvature. Thus, a rotor is not restricted to rotary motors.

What is claimed is:

1. A rotor for a synchronous motor, comprising:
   a rotor core;
   teeth arranged at regular intervals, projecting from the rotor core in a radial direction, and tapering in cross-section in a direction toward the rotor core; and
   tangentially magnetized magnets having a trapezoidal cross-sectional shape tapering in a direction away from the rotor core, the magnets arranged in gaps between the teeth alternating circumferentially between a first magnet and a second magnet;
   wherein the teeth are connected to the rotor core by flexible joints, the teeth being deflected in a tangential direction such that the first magnets rest against outer stops located in an end region of the teeth facing away from the rotor core and the second magnets are retained closer to the rotor core than the first magnets by a positive engagement with lateral surfaces of the teeth.

2. The rotor according to claim 1, wherein the magnets are divided into two parts.

3. The rotor according to claim 2, wherein each magnet is divided into an outer magnet piece, having a trapezoidal cross-section, and an inner magnet piece.

4. The rotor according to claim 3, wherein the inner magnet piece has a trapezoidal or rectangular cross-section.

5. The rotor according to claim 3, wherein the inner magnet pieces rest against inner stops premolded on the rotor core between the teeth, so that all inner magnet pieces are located at a same distance from the rotor core.

6. The rotor according to claim 3, wherein a first gap is located between the outer magnet piece and the inner magnet piece of each first magnet, and either (a) a second gap, smaller than the first gap, is located between the outer magnet piece and the inner magnet piece of the second magnets or (b) no gap is located between the outer magnetic piece and the inner magnetic piece of the second magnets.

7. The rotor according to claim 3, wherein the outer magnet piece and the inner magnet piece of each first magnet are spaced apart by a first gap located between the outer magnet piece and the inner magnet piece of each first magnet, and either (a) the outer magnet piece and the inner magnet piece of the second magnets are spaced apart by a second gap, smaller than the first gap, located between the outer magnet piece and the inner magnet piece of the second magnets or (b) no gap is located between the outer magnetic piece and the inner magnetic piece of the second magnets.

8. The rotor according to claim 1, wherein the rotor is arranged as a secondary part of a rotary or linear synchronous motor.

9. A method for producing a rotor according to claim 1, comprising:
   inserting all outer magnet pieces of the first magnets into every other gap between the teeth; and
   tangentially deflecting the teeth adjacent to the first magnets so that the inserted outer magnet pieces rest against the outer stops.

10. The method according to claim 9, further comprising inserting inner magnet pieces, and pushing the inner magnet pieces toward the rotor core by magnetic repulsion of a respective outer magnet piece so that the inner magnet pieces rest against inner stops provided on the rotor core.

11. The method according to claim 10, further comprising inserting outer magnet pieces of the second magnets into empty gaps between the teeth, the outer magnet pieces of the second magnets moving away from the rotor core so that the second magnets are retained by a positive engagement with lateral surfaces of the teeth.

12. The method according to claim 9, further comprising inserting outer magnet pieces of the second magnets into empty gaps between the teeth, the outer magnet pieces of the second magnets moving away from the rotor core so that the second magnets are retained by a positive engagement with lateral surfaces of the teeth.

13. The rotor according to claim 1, wherein the rotor is produced by a method that includes:
   inserting all outer magnet pieces of the first magnets into every other gap between the teeth; and
   tangentially deflecting the teeth adjacent to the first magnets so that the inserted outer magnet pieces rest against the outer stops.

14. The rotor according to claim 1, wherein the rotor is produced by a method that includes:
   inserting all outer magnet pieces of the first magnets into every other gap between the teeth arranged at regular intervals on the rotor core of the rotor, the teeth projecting from the rotor core in the radial direction, the teeth tapering in cross-section in the direction toward the rotor core, the teeth being connected to the rotor core by the flexible joints, the first magnets being tangentially magnetized and having the trapezoidal cross-sectional shape; and
   tangentially deflecting the teeth adjacent to the first magnets so that the inserted outer magnet pieces rest against the outer stops located in the end region of the teeth facing away from the rotor core.

15. A method for producing a rotor of a synchronous motor, comprising:
   inserting all outer magnet pieces of first magnets into every other gap between teeth arranged at regular intervals on a rotor core of the rotor, the teeth projecting from the rotor core in a radial direction, the teeth tapering in cross-section in a direction toward the rotor core, the teeth being connected to the rotor core by flexible joints, the first magnets being tangentially magnetized and having a trapezoidal cross-sectional shape; and
   tangentially deflecting the teeth adjacent to the first magnets so that the inserted outer magnet pieces rest against outer stops located in an end region of the teeth facing away from the rotor core wherein the rotor produced by the method includes: the rotor core; the teeth arranged at the regular intervals; projecting from the rotor core in the radial direction, and tapering in cross-section in the direction toward the rotor core; and the tangentially magnetized magnets having the trapezoidal cross-sectional shape tapering in a direction away from the rotor core, the magnets arranged in the gaps between the teeth alternating circumferentially between a first magnet and a second magnet; wherein the teeth are connected to the rotor core by the flexible joints, the teeth being deflected in the tangential direction such that the first magnets rest against the outer stops located in the end region of the teeth facing away from the rotor core and the second magnets are retained closer to the rotor core than the first magnets by a positive engagement with lateral surfaces of the teeth.

16. The method according to claim 15, further comprising inserting an inner magnet piece of each of the first magnets into a respective second gap between the teeth, and pushing the inner magnet pieces toward the rotor core by magnetic repulsion of a respective outer magnet piece so that the inner magnet pieces rest against inner stops provided on the rotor core.

17. The method according to claim 16, further comprising inserting outer magnet pieces of remaining second magnets into empty gaps between the teeth, the outer magnet pieces of the remaining second magnets moving away from the rotor core so that the remaining second magnets are retained by a positive engagement with lateral surfaces of the teeth.

18. The method according to claim 15, further comprising inserting outer magnet pieces of remaining second magnets into empty gaps between the teeth, the outer magnet pieces of the remaining second magnets moving away from the rotor core so that the remaining second magnets are retained by a positive engagement with lateral surfaces of the teeth.

* * * * *